United States Patent [19]

Krenke

[11] E Re. 30,022

[45] Reissued Jun. 5, 1979

[54] PUSHER RAM AND QUENCH CAR TRAVEL SYNCHRONIZATION SYSTEM

[75] Inventor: Vincent G. Krenke, Pittsburgh, Pa.

[73] Assignee: Koppers Company, Inc., Pittsburgh, Pa.

[21] Appl. No.: 807,192

[22] Filed: Jun. 16, 1977

Related U.S. Patent Documents

Reissue of:

[64] Patent No.: 3,897,311
Issued: Jul. 29, 1975
Appl. No.: 381,363
Filed: Jul. 20, 1973

[51] Int. Cl.[2] ..... C10B 35/00; C10B 47/00

[52] U.S. Cl. ..... 202/262; 201/1; 202/227; 414/148

[58] Field of Search ..... 202/262, 270, 227, 228, 202/229, 230, 263; 214/23; 201/1

[56] References Cited

U.S. PATENT DOCUMENTS

| | | | |
|---|---|---|---|
| 3,017,622 | 1/1962 | Horsfall | 202/262 |
| 3,124,736 | 3/1964 | Randell et al. | 214/23 |
| 3,304,241 | 2/1967 | Radcliffe et al. | 202/262 |

FOREIGN PATENT DOCUMENTS

| | | | |
|---|---|---|---|
| 537244 | 4/1955 | Belgium | 202/262 |
| 816114 | 7/1959 | United Kingdom | 202/262 |
| 839650 | 6/1960 | United Kingdom | 202/262 |

*Primary Examiner*—Joseph Scovronek
*Assistant Examiner*—Roger F. Phillips
*Attorney, Agent, or Firm*—R. Lawrence Sahr

[57] ABSTRACT

An electrical pulsing unit in the pusher ram drive emits a pulse for every preselected incremental distance traveled by the ram from the face of the oven at the start of the push to the completion of the push. The pulses are received in the quench car locomotive and are converted to signals that show the position of the ram during its travel. The quench car has a similar pulsing unit, and pulses from this unit are converted to signals that show the position of the quench car. The quench car locomotive operator can then coordinate the signals to achieve proper coke distribution in the quenching car.

5 Claims, 2 Drawing Figures

PUSHER RAM AND QUENCH CAR TRAVEL SYNCHRONIZATION SYSTEM

Matter enclosed in heavy brackets [ ] appears in the original patent but forms no part of this reissue specification; matter printed in italics indicates the additions made by reissue.

BRIEF SUMMARY OF THE INVENTION

A system for coordinating and synchronizing the movement of the pusher ram of a pushing machine and the movement of the quench car includes pulse generating apparatus on both the pusher ram and on the quench car, and pulse receiving visual apparatus in the locomotive. Thus, the locomotive operator can observe the relative position of the ram in the oven and the quench car relative to the oven during the pushing cycle.

For a further understanding of the invention and for features and advantages thereof, reference may be made to the following description and the drawing which illustrates a preferred embodiment of a system in accordance with the invention.

DETAILED DESCRIPTION

Figure 1:
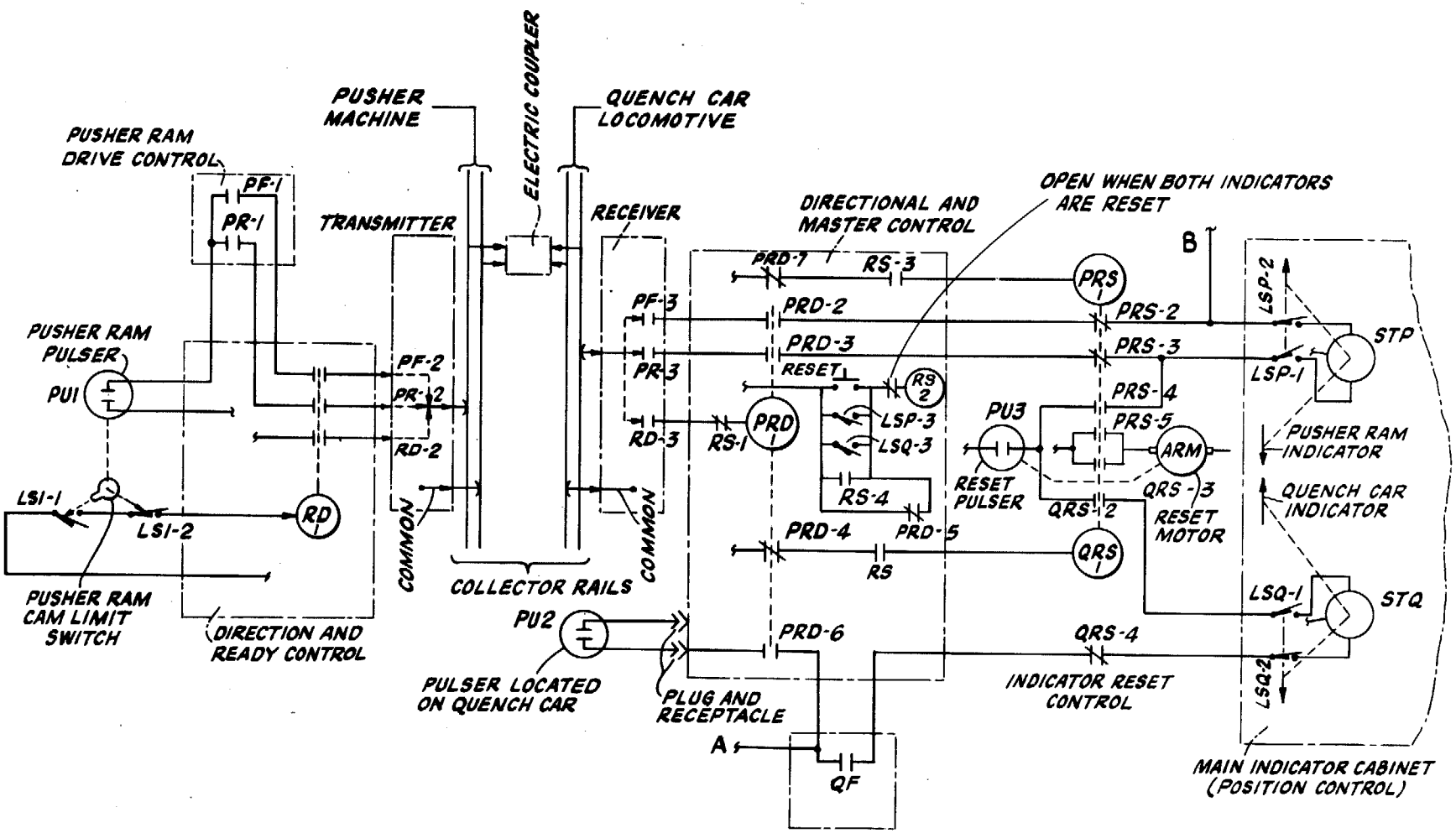
FIG. 1 is a simplified schematic electrical diagram of a system in accordance with the invention.
Figure 2:
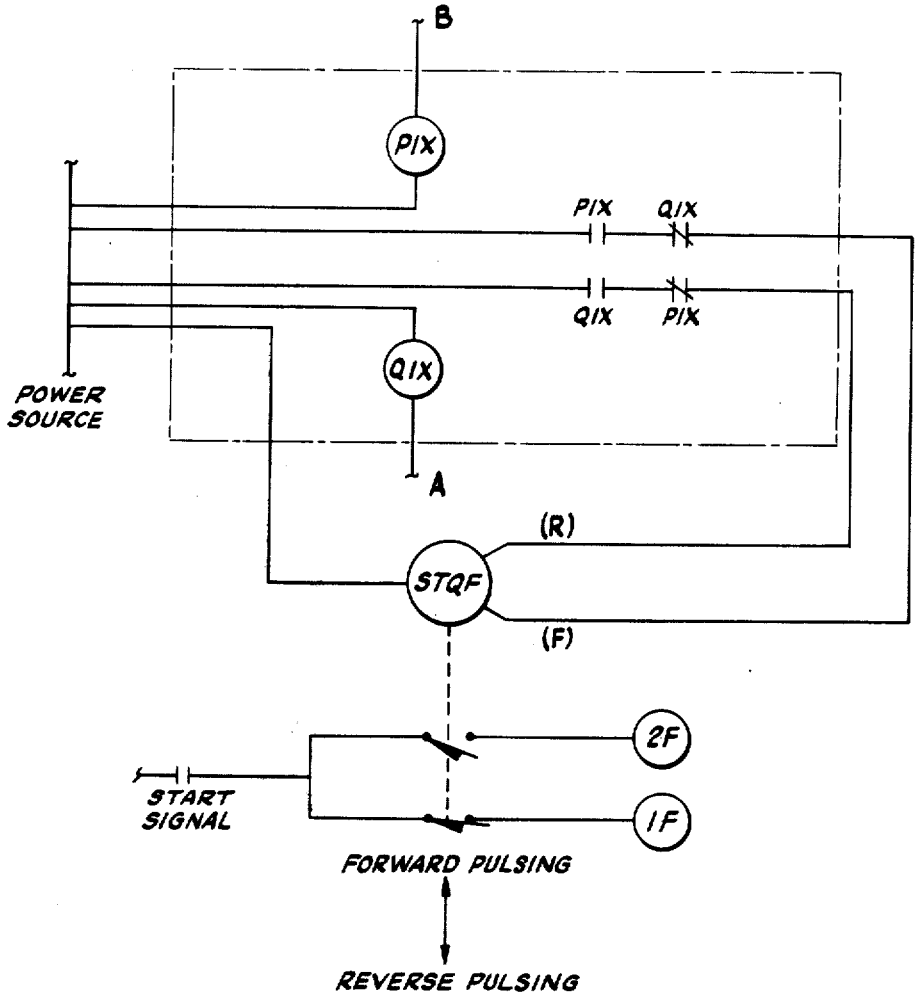
FIG. 2 is a similar electrical diagram of an automatic quench car control associated with the system of FIG. 1.

In general, the system of the present invention, as represented by the embodiment shown in the electrical diagrams of FIGS. 1 and 2, operates to allow the quench car locomotive operator to determine the position of the quench car in relation to the position of the pusher ram at any moment during the push and in relation to the amount of coke pushed from an oven.

The system of the invention may best be understood by referring to FIGS. 1 and 2 and the description of the sequence of events during a pushing cycle.

The pusher ram operator causes the ram to move toward the face of an oven to be pushed; it is understood, of course, that the pusher and coke side doors have previously been removed, that the pushing ram and coke guide equipment are aligned, and that all else is in order to commence pushing. At the face of the oven on the pusher side, limit switch LS1-1 closes when the ram contacts the cam limit switch. The pusher ram pulser unit PU1 has been activated and, when LS1-1 closes, relay RD-1 is energized; closing the circuit to a transmitter.

A pusher ram drive control contact PF-1 has been previously closed, since it is in the ram forward drive circuit. Pusher ram drive control contact PR-1 remains inactive; but, it would be actuated and closed should the pusher ram operator need to reverse the direction of movement of the ram for any reason after the ram has moved part way into the oven.

A signal is then sent from the transmitter through the collector rails of the pusher machine and quench car locomotive to a receiver in the quench car locomotive. Whereupon, the RD-3 signal path in the receiver normally open, closes. Also the forward movement contact PF-3, also normally open, closes, since the ram is moving forward in the oven.

When contact RD-3 closes, relay PRD-1 is energized and closes a circuit [to] *between* a stepping motor STP [on] *and* the pushing ram. The signal carried by the RD circuit is a steady signal; whereas, the signal carried by each of the PF and PR circuits is a pulsing signal.

When the pusher ram has moved into the oven far enough to deposit enough coke in the end of the quench car, the quench car locomotive will be started. Pulser PU2, located on the quench car, is energized and contact QF in the forward drive circuit closes, thereby completing a circuit to a stepping motor STQ.

Both stepping motor STP and stepping motor STQ continue to receive pulses and the respective pusher ram and the quench car indicators will show the relative positions of the pusher ram and the quench car. The pusher ram and the quench car continue to move in their respective ways until one of several things occurs to stop the operations.

When the pusher ram reaches the end of its stroke, limit switch LS1-2 opens under the influence of a pusher ram cam, and shuts off all signals to and through the transmitter. Relay PRD-1 is de-energized and closes and energizes a circuit to the reset relay RS. It is possible also to manually operate the reset relay to accomplish the same thing.

Should either stepping motor STP or stepping motor STQ move to its maximum position ahead of time, the stepping motor that is ahead activates RS-2 by limit switches LSP-3 and LSQ-3. Relays PRS-1 and QRS-1 are energized, whereupon the reset motor starts which drives reset pulser PU3. Pulser PU3 sends pulses to both stepping motors STP and STQ, but in the reverse direction to reset the respective indicators.

The stepping motors continue to turn until the indicators return to their original starting positions. Whereupon, LSQ-1 and LSP-1 open and, simultaneously, when both indicators are reset, relay R5-2 is deenergized. The pulser motor is stopped and reset pulser PU3 is disconnected from the reset circuits.

When the pusher ram has traveled its full stroke and makes contact with limit switch LS1-2, a light indicator and horn sound in the control cab of the pushing machine. This alerts the pushing machine operator who then reverses the movement of the pusher ram and retracts it from the oven.

In like manner, when the quench car locomotive operator sees a light and hears a horn sound as the reset operations take place, he knows that the pushing operation is completed and he then manually activates the locomotive controls to move the quenching car to the quenching station.

All is now ready for the next push. The foregoing describes how the quench car indicator and the pusher ram indicator operate whether the quench car movement is controlled manually by an operator or automatically. If an automatic drive system or electrical circuit is used to move the quench car at a rate of speed that is comparable to the rate at which the coke is being pushed by the pusher ram, then the following operation takes place.

Referring to FIG. 2, when the pusher ram is moving forward and the pusher ram pulser PU1 is emitting signals, relay P1X of FIG. 2 will send pulses to STQF (stepping motor); the circuit of FIG. 2 being connected to that of FIG. 1 at the lines A and B. In like manner, when the quench car is moving and the pulser PU2 is emitting signals, relay Q1X will also send pulses to STQF.

Pulses from P1X relay will cause forward movement of the stepping motor and pulses from Q1X will cause reverse movement of STQF. So, if both relays P1X and Q1X are pulsing an equal number of times for any given period, then STQF will not move.

Under this condition, relay 1F would drive the quench car at a slow speed to catch coke. If P1X relay pulses faster than Q1X relay, then STQF will move forward at a rate controlled by the difference in the pulses of the two relays. Then, the pusher ram is pushing coke faster than the quench car is catching coke.

Under this condition, STQF moves the cam limit switch onto step 2F speed control of the quench car, which allows Q1X to catch up to the rate of pulsing of relay P1X and to overtake it perhaps.

In this instance STQF will begin to receive more reverse pulses and drive the rotary cam limit switch from the higher second control speed (2F) of the quench car to again effect a balance.

Q1X may overtake and get ahead of P1X relay and then drive STQF in a reverse direction. This will shut off the power supply to the quench car momentarily until a balance is again restored between the pulsing relays. Ideally, the speed of the quench car will be equal to the speed of the pushing ram.

Resetting of the stepping motor STQF and cam limit switch may be accomplished in the same manner as stepping motors STP and STQ by making a connection to these circuits at the proper points.

From the foregoing description of one embodiment of the invention, those skilled in the art should recognize many important features and advantages of it, among which the following are particularly significant:

That the pusher ram and quench car travel synchronization system of the present invention operates automatically, thereby reducing significantly the usual human error problem in synchronizing the activity on opposite sides of a coke oven battery;

That the system is simple to construct, but yet is effective and easy to install.

Although the invention has been described herein with a certain degree of particularity it is understood that the present disclosure has been made only as an example and that the scope of the invention is defined by what is hereinafter claimed.

I claim:

1. A system for synchronizing [the travel of a pusher ram in a coke oven chamber with], *with the travel of a pusher ram in a coke oven chamber,* the travel of a coke quenching car [receiving] *that receives* hot coke from an oven chamber and [propelled] *that is moved* by a locomotive relative to such oven chamber, wherein the improvement comprises:

a. a switch means activated by said pusher ram as it moves toward and into an oven chamber to be pushed and closing an electrical circuit;

b. a [pulse transmitter] *first pulser* in said circuit, which is activated when said switch means closes, that emits pulses;

c. electrical receiver means in said locomotive that receives said emitted pulses and thereafter energizes an electrical circuit wherein there is d. a first stepping motor [that actuates said pusher ram] *energized* in a step-by-step manner, responsive to the received pulses [and circuit energization;] *from said first pulser;* e. a *second* pulser, in said quenching car, that is [energized] *activated* by [a signal emitted] *movement of said quenching car which emits pulses that are received* by said receiver;

f. a second stepping motor that is energized [by said pulser and that moves said quenching car in a step-by-step manner in sequence with said pusher ram;], *in a step-by-step manner, responsive to the received pulses from said second pulser;* and g. indicator means in said locomotive that is responsive to said [stepping motors] *first stepping motor and said second stepping motor* and indicates the relative positions of the pushing ram and the quenching car.

2. The invention of claim 1 including:

a. *de-energizing* means actuated by said pusher ram at the end of its stroke for de-energizing said [circuitry] *electrical receiver means; and further comprising* b. a reset pulser energized by said [means that sends electrical pulse signals to both of said indicators] *actuation of said de-energization means* whereby said [indicators are] *indicator means is* reset to *its* initial [positions] *position.*

3. The invention of claim 2 including:

a. switch means, actuated when said [indicators return] *indicator means returns* to the initial position, that de-energizes [a power circuitry to said pulse transmitter] *said electrical circuit.*

4. A system for synchronizing [the travel of a pusher ram in a coke oven chamber with] , *with the travel of a pusher ram in a coke oven chamber,* the travel of a coke quenching car receiving hot coke from the oven chamber and propelled by a locomotive relative to such oven chamber, wherein the improvement comprises:

a. switch means activated by said pusher ram, as it moves toward and into an oven chamber to be pushed, that closes an electrical circuit;

b. a first pulser, energized when said switch closes *said circuit,* that emits *first* pulse signals as said pusher ram moves into said oven chamber;

c. [a stepping motor actuated to turn in one direction responsively to said pulse signals] *a second pulser that emits second pulse signals as said quench car receives coke pushed from said oven chamber and moves relative thereto;* d. [a second pulser that emits pulse signals as said quench car receives coke pushed from said oven chamber and moves relative thereto; and] *a stepping motor actuated to turn in one direction responsively to the receipt of said first pulse signals and actuated to turn in the opposite direction responsive to the receipt of said second pulse signals, said stepping motor being so constructed that it does not rotate when said first pulse signals and second pulse signals are equal in number during any period of time, said stepping motor actuating movement of said quench car at a faster rate of speed when said number of said second pulse signals is less during said period of time than said number of said first pulse signals, and actuating movement of said quench car at a slower rate of speed when said number of said first pulse signals is less during said period of time than said number of said second pulse signals;* d. means [sending electrical signals from said second pulser to said stepping motor whereby said stepping motor turns in a direction opposite to said one direction, said stepping motor being so construed that it does not rotate when the pulse signals from said first and said second pulsers are equal in number during any period.] *transmitting said first pulse signals from said first pulser to said stepping motor; and*

*f. means transmitting said second pulse signals from said second pulser to said stepping motor.*

[5. The invention of claim 4 wherein:

a. said stepping motor rotates in a direction to move said quench car at a faster rate of speed when the number of pulses received from said second pulser is less for said period of time than the number of pulses received from said first pulser; and wherein b. said stepping motor, when it receives more pulses from said second pulser than from said first pulser, actuates a rotary cam limit switch to effect control of the speed of said quench car, to thereby affect a balance of position between the quench car and the pusher ram.]

6. The invention of claim 4 wherein:

a. said stepping motor, when it receives [more] *a differential in* pulses from said first pulser [than] *and* said *second* pulser, actuates a rotary cam limit switch to effect control of the speed of the quench car to thereby effect a [balance] *synchronization* between the quench car and the pusher ram.

* * * * *